No. 658,238. Patented Sept. 18, 1900.
C. J. COLEMAN.
MOTOR VEHICLE.
(Application filed Sept. 2, 1899.)
(No Model.) 2 Sheets—Sheet 2.
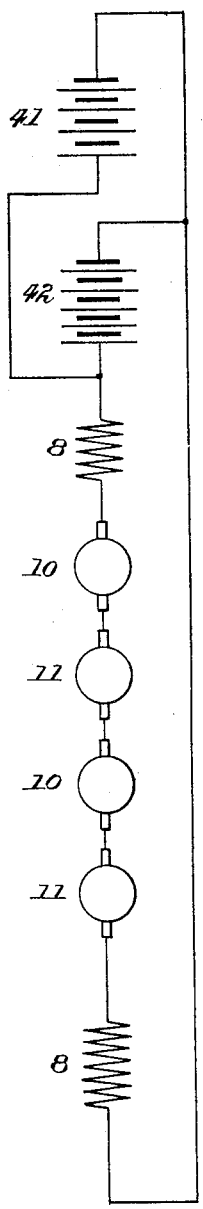
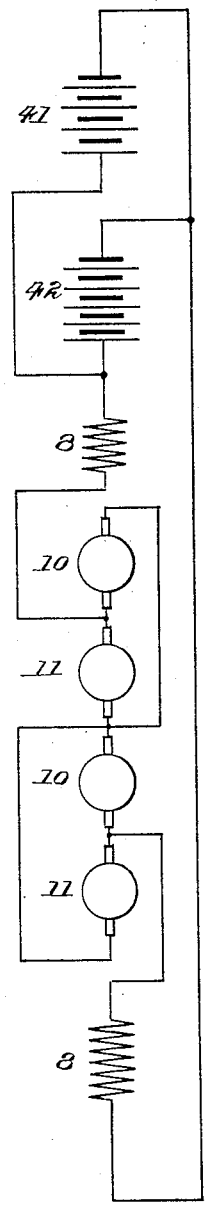
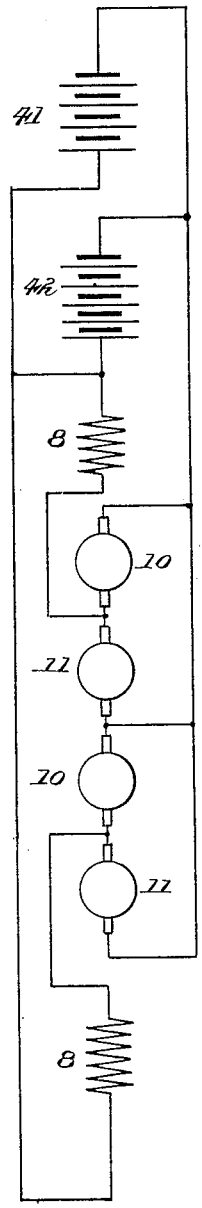
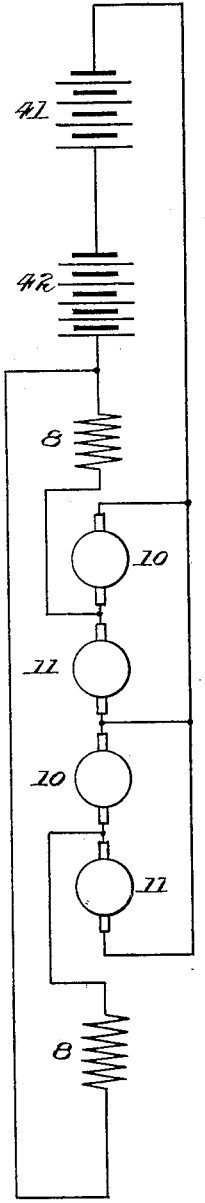
Attest:
John Enders, Jr.
M. H. Holmes.
Inventor:
Clyde J. Coleman,
by Robert Burns Attorney.

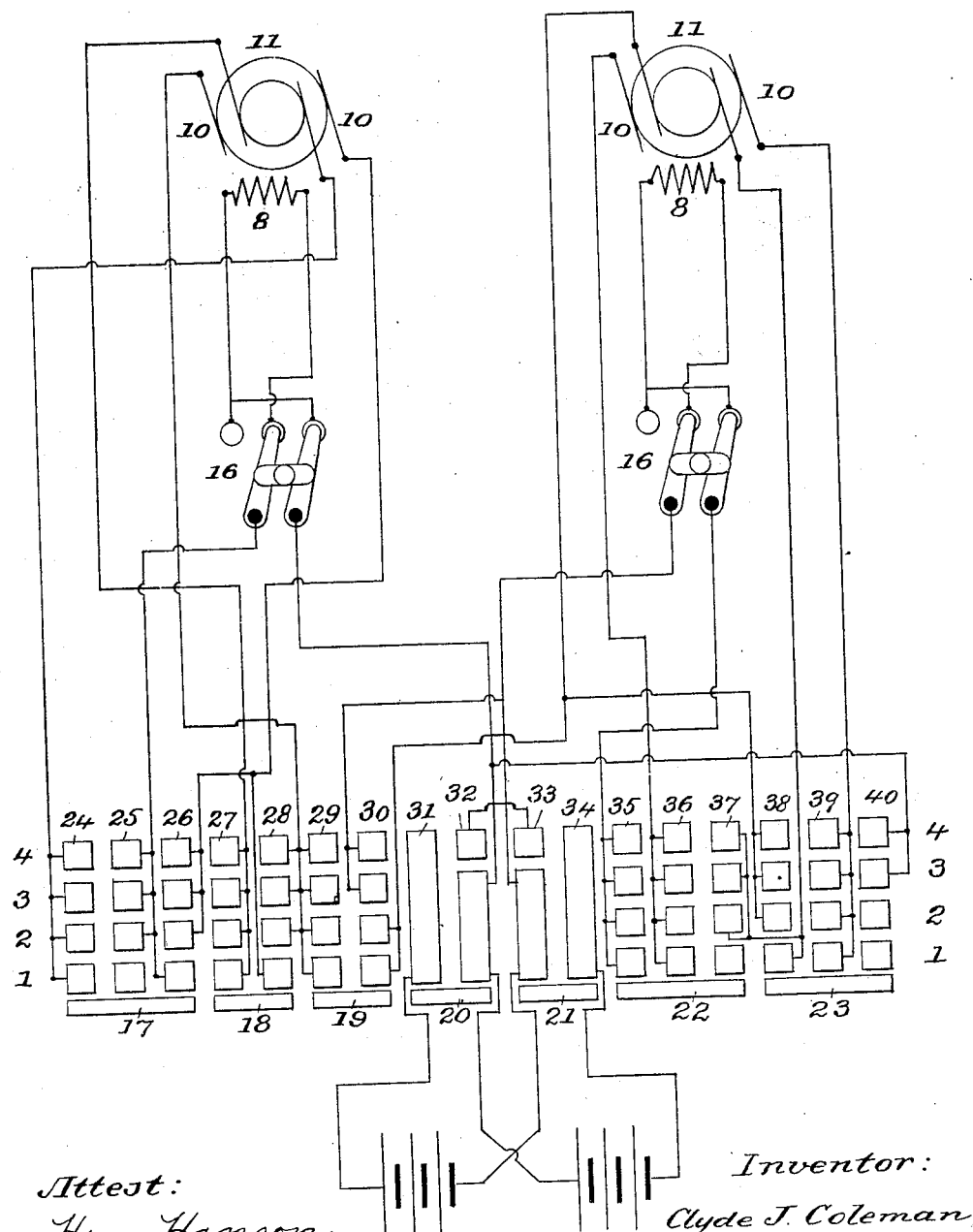

UNITED STATES PATENT OFFICE.

CLYDE J. COLEMAN, OF CHICAGO, ILLINOIS, ASSIGNOR OF FIFTY-ONE ONE-HUNDREDTHS TO THOMAS J. RYAN, OF SAME PLACE.

MOTOR-VEHICLE.

SPECIFICATION forming part of Letters Patent No. 658,238, dated September 18, 1900.

Application filed September 2, 1899. Serial No. 729,359. (No model.)

*To all whom it may concern:*

Be it known that I, CLYDE J. COLEMAN, a citizen of the United States, residing at Chicago, in the county of Cook and State of Illinois, have invented certain new and useful Improvements in Motor-Vehicles, (Case No. 5;) and I do hereby declare the following to be a full, clear, and exact description of the same, reference being had to the accompanying drawings, forming a part of this specification.

The present invention relates to motor-vehicles in which electricity is employed as the motive power.

The object of the present improvement is in the main to provide a simple and efficient system of current-control for varying the speed of the electric motors employed in propelling the vehicle and in which the series of motors, the series of multiple-wound armatures, and the series of storage batteries are capable of being independently arranged in series, in multiple, and in series multiple, to afford a very extensive range of control without involving the employment of variable resistances or rheostats and the consequent loss of energy resulting from the use thereof, all as will hereinafter more fully appear.

In the accompanying drawings, illustrative of the present invention, Figure 1 is a diagram view illustrating the motors, circuits, and controlling-switches of the present improvement. Figs. 2, 3, 4, and 5 are diagram views illustrating the different circuits of the present system.

Similar numerals of reference indicate like parts in the several views.

In the construction shown each electric motor will comprise a non-rotative field 8, usually of the ordinary bobbin type, and carried by the individual axle of the particular driving-wheel, and an annular rotative armature 9, wound in any usual manner, with commutators 10, carried thereby, such commutators having contact with stationary commutator-brushes 11, attached to the motor-field or other fixed part of the motor, as illustrated in Figs. 2 and 3 of the drawings.

The present invention involves a system of current-control for the series of independent motors by which the vehicle is propelled, as well as for the series of storage batteries supplying electrical energy for operating the motors, and with which the motors, the series of multiple-wound motor-armatures, and the series of storage batteries can be so connected and controlled to operate in series, in multiple, or in series multiple in both an independent and conjoint manner, and thus afford an extensive range of control in the propulsion of the vehicle without resort to the use of resistance-coils and the like, with the consequent waste of electrical energy. In the construction shown in diagram view Fig. 1 of the drawings as illustrative of this part of the present invention a construction is shown involving a pair of motors, a pair of motor-armatures having pairs of independent coils or windings, and a pair of storage batteries. The scope of the present invention is not, however, limited to such number of such constituent elements of the system, but may be increased at will, with corresponding increase in the parts of the current-controller mechanism, as will be readily apparent to those skilled in the present art.

Referring to the diagram Fig. 1, 8 represents the field windings or coils, 11 represents the commutators, and 10 the commutator-brushes, of the respective motors. 16 are pole-changers or reversing-switches arranged in the field-circuits of the motors to afford means for the reversal of such motors. The main current-controller shown in the diagram view will comprise a series of seven bridging contact fingers or brushes 17, 18, 19, 20, 21, 22, and 23, adapted to have contact in manner hereinafter set forth with seventeen series of insulated contact-plates 24, 25, 26, 27, 28, 29, 30, 31, 32, 33, 34, 35, 36, 37, 38, 39, and 40, that are arranged in parallel relation, so as to constitute four transverse rows 1, 2, 3, and 4 of such contact-plates, as illustrated in Fig. 4. The four central or middle series of contact-plates 31, 32, 33, and 34 constitute the battery-terminals of the current-controller, and for such purpose have line-wire connections with the series of storage batteries 41 and 42, as shown, and such series constitute in turn pairs of positive and negative terminals in adjacent relation, with each of such last-mentioned pairs having its individual bridging contact finger or brush 20 or 21. The two outer positive and negative terminals 31 and 34 of the current-controller will comprise a pair of insulated plates equal in length to that of the four contact-plates of the other series of the controller, while the inner and adjacent series of positive and negative terminals 32 and 33 will comprise a lower pair of terminal contact-plates of a length equal to three of the contact-plates of the other series of the current-controller and a pair of upper contact-plates of an equal length to that of such other plates of the current-controller. Such upper contact-plates have no direct connection with the batteries, but are connected together by a cross-line connection, so that when the pair of contact-fingers 20 and 21 are in their fourth position to contact with such plates the circuits of the batteries will be arranged in series. The two lower contact-plates just described have direct connection with the fields 8 of the motors by line-wire connections, as shown, the return from which fields extends back to the batteries in an indirect manner, as hereinafter described. The seven series of contact-plates 24, 25, 26, 27, 28, 29, and 30 to the left in the drawings are mainly devoted to the multiple windings of the armature of the motor to the left in the drawings, while the six series of contact-plates to the right in the drawings are mainly devoted to the multiple windings of the armature of the motor to the right in the drawings.

The connections of the multiple windings of the armature of the motor to the left with the current-controller are as follows: by line conductor from first, second, third, and fourth contact-plates of series 24 to one armature-winding and back through another line conductor to first, second, third, and fourth contact-plates of series 27, by line conductor from second, third, and fourth contact-plates of series 28 and first, second, third, and fourth contact-plates of series 29 to the other armature-winding and back through another line conductor to first contact-plate of series 28 and second, third, and fourth contact-plates of series 26.

The connections of the multiple armature-windings of the motor to the right in the drawings with the current-controller are as follows: by line conductor from first contact-plate of series 38 and second, third, and fourth contact-plates of series 37 to one armature-winding and back through another line conductor to second, third, and fourth contact-plates of series 38 and first and second contact-plates of series 30, by line conductor from first, second, third, and fourth contact-plates of series 36 to the other armature-winding and back through another line conductor to first, second, third, and fourth contact-plates of series 39.

The field of the motor to the left is connected as follows with the current-controller: by line conductor, as heretofore described, from lower contact-plate or battery-terminal of series 32 to field and back through another line conductor to the first contact-plate of series 26 and second, third, and fourth contact-plates of series 25.

The field of the motor to the right is connected as follows with the current-controller: by line conductor, as heretofore described, from lower contact-plate or battery-terminal of series 33 to field and back through another line conductor to the first, second, third, and fourth contact-plates of series 35.

Other connections of the contact-plates of the current-controller are as follows: third and fourth contact-plates of series 40 by line conductor with lower contact-plate or battery-terminal of series 32, second, third, and fourth contact-plates of series 38 with first and second contact-plates of series 30 to afford a means for connecting the motors in series, third and fourth contact-plates of series 30 by line conductor with lower contact-plate or battery-terminal of series 33.

The arrangement of the bridging contact fingers or brushes is as follows: The contact-finger 17 spans series 24, 25, and 26 of contact-plates. The contact-finger 18 spans series 27 and 28 of contact-plates. The contact-finger 19 spans series 29 and 30 of contact-plates. The contact-finger 20 spans series 31 and 32 of contact-plates. The contact-finger 21 spans series 33 and 34 of contact-plates. The contact-finger 22 spans series 35, 36, and 37 of contact-plates. The contact-finger 23 spans series 38, 39, and 40 of the contact-plates.

With an arrangement and connection of parts as above described the following changes in the different circuits can be effected: By moving the series of contact-fingers to first transverse row of controller contact-plates the batteries are placed in multiple, the independent armature-windings in series, and the motors in series, as shown in diagram view Fig. 2. By moving the series of contact-fingers to the second transverse row of controller contact-plates the batteries are placed in multiple, the independent armature-windings in multiple, and the motors in series, as shown in diagram view Fig. 3. By moving the series of contact-fingers to the third transverse row of controller contact-plates the batteries are placed in multiple, the independent armature-windings in multiple, and the motors in multiple, as shown in diagram view Fig. 4. By moving the series of contact-fingers to the fourth transverse row of controller contact-plates the batteries are placed in series, the independent armature-windings in multiple, and the motors in multiple, as shown in diagram view Fig. 5.

Having thus fully described my said invention, what I claim as new, and desire to secure by Letters Patent, is—

In an electrically-propelled motor-vehicle, the combination of a pair of electric motors, the armatures of which are provided with independent coils or windings, two or more groups of storage batteries, and a current-controller coöperating through its switch-brushes, in one position to close the circuits with the batteries in multiple and armature-windings in series, in another position to close the circuits with the batteries in multiple and the armature-windings in multiple series, in another position to close the circuits with the batteries in multiple and the armature-windings in multiple, and in another position to close the circuits with the batteries in series and the armature-windings in multiple, substantially as set forth.

In testimony whereof witness my hand this 30th day of August, 1899.

CLYDE J. COLEMAN.

In presence of—
 ROBERT BURNS,
 JAMES LAVALLIN.